Aug. 4, 1970     H. A. JOHANSEN     3,523,044

METHOD OF CARBIDING TANTALUM OR TANTALUM ALLOY AND FILAMENT

Filed Jan. 18, 1968     2 Sheets-Sheet 1

WITNESSES
Theodore F. Wrobel
James F. Young

INVENTOR
Herman A. Johansen
BY W. D. Palmer
ATTORNEY

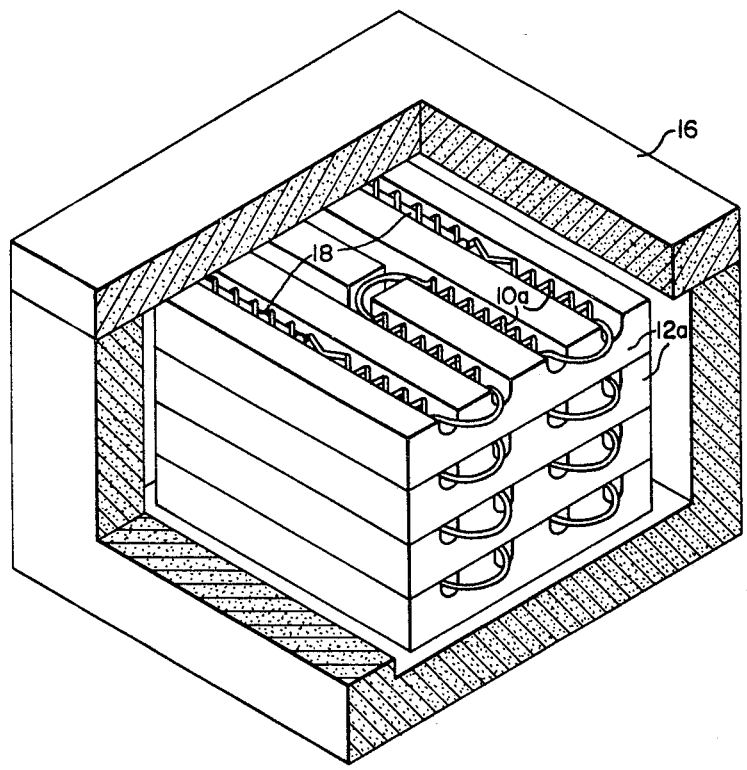
FIG. 5.
FIG. 6.
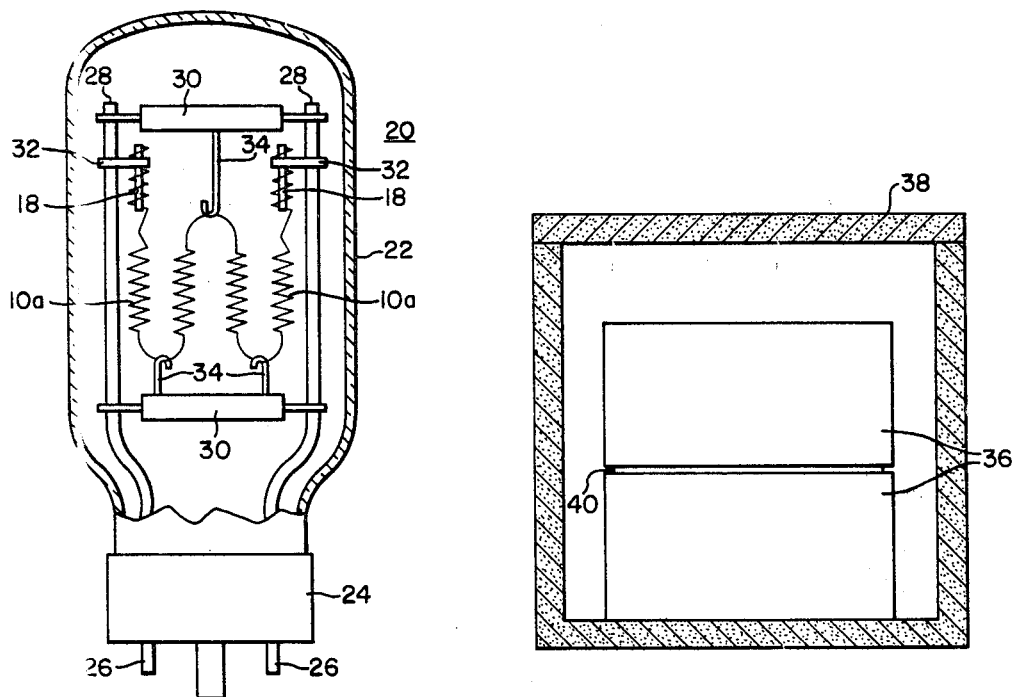
FIG. 7.

United States Patent Office 3,523,044
Patented Aug. 4, 1970

3,523,044
METHOD OF CARBIDING TANTALUM OR TANTALUM ALLOY AND FILAMENT
Herman A. Johansen, Monroeville, Pa., assignor to Westinghouse Electric Corporation, Pittsburgh, Pa., a corporation of Pennsylvania
Filed Jan. 18, 1968, Ser. No. 698,962
Int. Cl. C22c 29/00; H01k 1/04
U.S. Cl. 148—13.1        6 Claims

ABSTRACT OF THE DISCLOSURE

To rapidly carbide a member of tantalum, or an alloy principally comprising tantalum, the member is supported in a firing container consisting essentially of carbon as the only container component which will react with tantalum. For forming a filamentary member, the firing container is heated to heat the filamentary member to a temperature of from about 1800° C. to 2500° C. with the heating atmosphere being carbon, nitrogen and inert gas wherein the volume ratio of nitrogen to inert gas is from about 10/90 to 60/40. The heating is continued until the member displays the gold color of substantially stoichiometric tantalum carbide, and the carbided member is then cooled in a non-oxidizing atmosphere. The carbided filament contains a small amount of chemically combined nitrogen. The general carbiding procedure can be used to carbide and join thin refractory metal members, or to join relatively massive refractory metal carbide members.

BACKGROUND OF THE INVENTION

Tantalum carbide for use as an incandescible member for electric lamps wa suggested by Von Bolton in U.S. Pat. No. 915,657 dated Mar. 16, 1909. After this early work, the emergence of tungsten as a filamentary member for incandescent lamps rendered other potential filament materials impractical. In recent years, however, considerable effort has been expended upon the development of tantalum carbide as a filamentary material because of its favorable spectral emission properties and its melting point (about 4200° K.) which is the highest known for any substance. It is of course well known that the radiation from a body is a function of the fourth power of the temperature and, in addition, the higher the temperature of a body, the greater the shift toward the shorter wavelengths which produce more radiation in the visible region and thus a more efficient light source.

In order to carbide the tantalum for use in an incandescent lamp, much of the recent effort has been devoted to carbiding the tantalum after the lamp is fabricated and this is normally accomplished by including in the lamp envelope a volatile hydrocarbon such as ethylene, for example, along with other additive gases such as hydrogen or halogen. Representative of such a technique are U.S. Pat. Nos. 2,596,469, dated May 13, 1952 and 3,022,-439, dated Feb. 20, 1962.

It is also well known to carbide a tantalum filament prior to its incorporation in a lamp and such a process is disclosed in application Ser. No. 535,815, filed Mar. 21, 1966, and owned by the present assignee. A structure for mounting a previously carbided filament within a lamp envelope is disclosed in application Ser. No. 535,835, filed Mar. 21, 1966, and owned by the present assignee.

Tantalum carbide members other than filaments, or alloys principally tantalum carbide, have application where the members are to be exposed to extremely high temperatures, because of the very high melting point of the tantalum carbide. For such applications, it is frequently necessary to join together thin sheets of tantalum carbide, or to join together relatively massive pieces of tantalum carbide.

SUMMARY OF THE INVENTION

It is the general object of the present invention to provide an improved method for rapidly carbiding a member which is formed of tantalum or an alloy principally tantalum.

It is another object to provide a method for rapidly carbiding a filamentary member which at least principally comprises tantalum.

It is an additional object to provide a method for carbiding a tantalum filamentary member while limiting the maximum temperatures which are used to effect the carbiding.

It is yet another object to provide a method for joining together previously carbided and relatively massive members.

It is a further object to provide a method for joining together thin tantalum members while simultaneously converting the members to tantalum carbide.

It is still another object to provide a tantalum carbide filament which, prior to incandescence, contains a small amount of chemically combined nitrogen.

The foregoing objects of the invention, and other objects which will become apparent as the description proceeds, are achieved by supporting the member to be carbided in a firing container which consists essentially of carbon as the only container component which will react with tantalum. The container is heated in order to heat the tantalum member to a temperature of at least about 1800° C., with the heating atmosphere consisting essentially of carbon and nitrogen as the only reactive gases, and any remaining gaseous component in the firing temperature being inert gas, with the volume ratio of nitrogen to inert gas being at least 10/90. The heating is continued until the member being carbided displays the gold color of substantially stoichiometric tantalum carbide, and the carbided member is thereafter cooled in a non-oxidizing atmosphere. In the case of a filament, the fabricated filament, prior to any energization to incandescence, contains a small amount of chemically combined nitrogen.

BRIEF DESCRIPTION OF THE DRAWINGS

For a better understanding of the invention, reference should be made to the accompanying drawings, wherein:

FIG. 5 is a perspective view of the firing container, partly broken away, showing how a plurality of filamentary members can be stacked during the firing procedure;

FIG. 6 is an elevational view, shown partly in section, illustrating a projection lamp which incorporates a filamentary member previously carbided in accordance with the present invention; and FIG. 7 is an elevational view, shown partly in section, illustrating the firing container and two massive carbided members in the process of being joined in accordance with the present invention.

DESCRIPTION OF THE PREFERRED EMBODIMENTS

Figure 1:
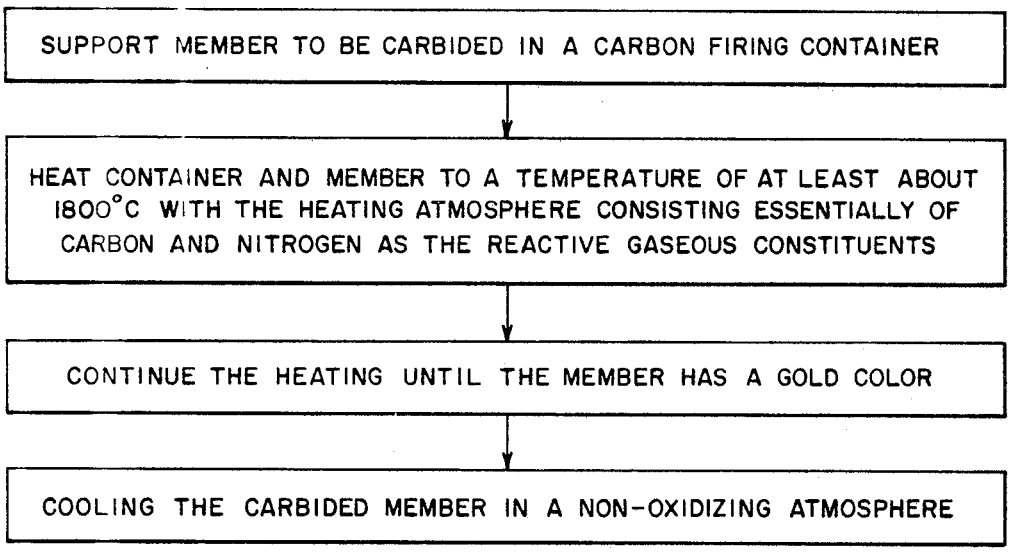
FIG. 1 is a flow diagram setting forth the basic steps of the present method.
Figure 2:
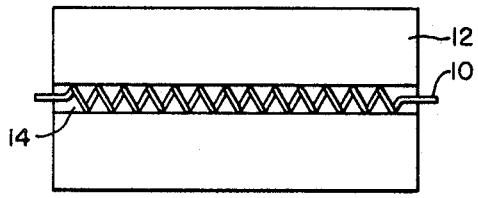
FIG. 2 is a plan view of a tantalum filamentary member supported in a graphite crucible, prior to the firing procedure.
Figure 3:
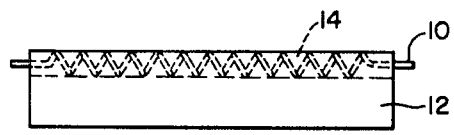
FIG. 3 is an elevational view of the firing crucible and supported filamentary member as show nin FIG. 2.
Figure 4:
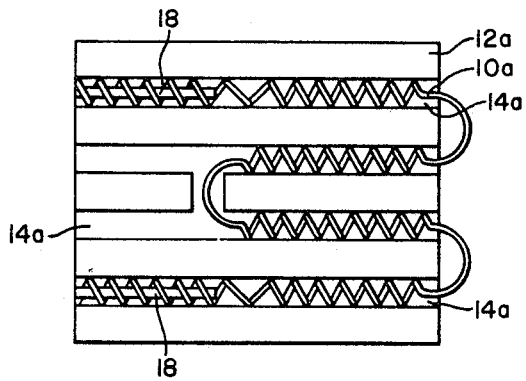
FIG. 4 is a plan view of a modified crucible which adaptable to support a multi-section filament during the firing procedure.

With specific reference to the form of the invention illustrated in the drawings, the basic steps of the present method are shown in the flow diagram of FIG. 1. More specifically, and as shown in FIGS. 2 and 3, to carbide a filamentary member in accordance with the present invention, the filamentary member 10, which is formed of tantalum or an alloy principally comprising tantalum, is supported throughout its length in a graphite crucible 12 which has a slot 14 provided therein to receive the filamentary member. An alternative crucible and filamentary construction is shown in FIG. 4 wherein the filamentary member 10a is formed as a multi-section filament, such as may be used in a projection lamp. This filament is mounted in the modified firing crucible 12a which is provided with a plurality of receiving slots 14a adapted to retain the multi-section filament 10a during the carbiding procedure, as explained hereinafter.

From a production standpoint it is preferred to carbide a plurality of filaments at the same time and this is readily accomplished by stacking a plurality of the crucibles 12a in a surrounding graphite firing container 16, as is shown in FIG. 5. The use of the stacked crucibles such as is shown in FIG. 5 is disclosed in the aforementioned copending application Ser. No. 535,835. It should be understood that the filamentary mateiral initially can be formed of tantalum or an alloy which principally comprises tantalum, as is well known. For example, in Pat. No. 3,022,437, dated Feb. 20, 1962, it is disclosed that metals such as titanium, thorium, vanadium, niobium, molybdenum, tungsten and uranium can be alloyed with the tantalum in forming the carbide filament. Also, in Pat. No. 3,022,436 dated Feb. 20, 1962, it is disclosed that zirconium and hafnium can be alloyed with the tantalum prior to the carbiding. As a matter of practicality, it has been found that a homogeneous tungsten-tantalum carbide comprising about 90% by weight tantalum carbide and 10% by weight tungsten carbide forms the most suitable filamentary material for a high intensity lamp such as projection lamp, when carbided in accordance with the present invention.

In accordance with the present invention, the filamentary material of tantalum or alloy which principally comprises tantalum is first formed into its desired configuration, which may be a coil, as shown in the foregoing figures, or a coiled-coil, and such a construction is well known in the filament-making art. The filament to be carbided is supported in a firing container which consists essentially of carbon as the only container component which will react with tantalum, and in the specific example described hereinbefore, the container is formed of graphite. In the case of a filament, the container 16, as shown in FIG. 5, is then heated to heat the filamentary member substantially uniformly throughout its mass to a temperature of from about 1800° C. to about 2500° C. while simultaneously maintaining the heating temperature at less than that temperature required to melt any surface portion of the filamentary member 10 or 10a. The heating atmosphere within the container consists essentially of carbon, nitrogen and inert gas wherein the volume ratio of nitrogen to insert gas is from about 10/90 to about 60/40. The nitrogen has a most unexpected effect in promoting the carbiding of the filament and its use enables the carbiding to be effected in a very rapid fashion at a relatively low temperature, as contrasted to those carbiding temperatures used in the practices of the prior art. The container heating is continued until the filamentary member displays the gold color and weight of substantially stoichiometric tantalum carbide, and thereafter the container and filamentary member are cooled in a non-oxidizing atmosphere, such as inert gas.

As noted hereinbefore, the nitrogen has a marked effect in promoting the carbiding and there is some tendency to melt the surface portions of the filamentary member during the initial heating stages if the heating temperature is too high. For this reason, it is preferred to initially heat the filamentary member to a temperature from about 1800° C. to about 2100° C. for at least about ten minutes with the container atmosphere during this initial heating consisting essentially of carbon and inert gas. Thereafter, nitrogen is introduced into the atmosphere in the proportions are indicated hereinbefore and the heating temperature preferably maintained at from about 2100° C. to about 2300° C. for about one hour. The ratio of nitrogen to inert gas is not particularly critical but is preferably maintained at a volume ratio of nitrogen to inert gas of about 30/70.

In control tests, three identical 15 mil coils (90% Ta—10% W) were carbided using the same heating times and temperatures, with only the atmosphere varied. In a first test, the filamentary member was heated at a temperature of 1800° C. for twenty minutes in an atmosphere of argon and carbon, and thereafter the same member was heated for one hour at a temperature of 2400° C. in an atmosphere of argon and carbon. The resulting filament was very poorly carbided and its composition was measured as $TaC_{0.32}$. The foregoing test was repeated with an identical filament except that the initial heating at 1800° C. for twenty minutes was conducted in an atmosphere of 30 volume percent nitrogen—70 volume percent argon, with the latter heating at 2400° C. conducted in the argon atmosphere. The resulting filament was still poorly carbided and displayed the composition $TaC_{0.65}$. In a final test, the initial heating was conducted in argon and the latter heating at 2400° C. was conducted in an atmosphere of 30 volume percent nitrogen—70 volume percent argon. This produced a filament which was substantially TaC. It should be understood that the carbon which is present in the atmosphere during the carbiding is introduced by the carbon which is volatilized from the supporting crucible and the surrounding graphite container.

The present procedure can also be used to join the filamentary member to a tantalum carbide support therefor during the carbiding process. Such a technique is generally disclosed in the aforementioned copending application 535,835. More particularly, referring again to FIG. 4, each support rod 18 is initially formed of tantalum and is inserted into an extending end portion of the multisection filament 12a. During the carbiding technique as described hereinbefore, both the filamentary member 10a and the rods 18 will be carbided and during this carbiding a diffusion bond or weld will be made between the overlying portion of the filamentary member 10a and the rods 18.

A projection lamp 20 which incorporates the present tantalum carbide filament is shown in FIG. 6. Briefly, the lamp 20 comprises a light-transmitting glass envelope 22 which terminates in a base 24 having pins 26 affixed thereto for purposes of electrical contact. The pins are electrically connected to a supporting frame 28 within the envelope and has arbors 30 connected therebetween. The filament 10a is mechanically mounted within the envelope by making electrical connection through contact-support members 32 to the rods 18, and the individual sections of the filament 10a are supported by supplemental support wires 34. The gas fill within the envelope is preferably nitrogen or nitrogen plus inert gas.

In copending application Ser. No. 698,963 filed concurrently herewith, and owned by the present assignee is disclosed a lamp which incorporates an incandescible filament principally comprising substantially stoichiometric tantalum carbide, and wherein the gaseous filling within the lamp envelope consists essentially of nitrogen as the only reactive gaseous component. A filament 10 or 10a, fabricated in accordance with the present invention, will contain from 0.05 to 0.5 weight percent of nitrogen, taken with respect to the total filament weight, prior to any incandescence of the filament within the lamp envelope. Apparently the presence of this chemically combined nitrogen results from the present method of carbiding, and acts to improve the lamp performance at very high operating temperatures such as 3500° K. or greater.

The foregoing method can also be used to join thin members of tantalum metal or alloy principally comprising tantalum metal while simultaneously converting the members to tantalum carbide or an alloy principally comprising tantalum carbide, and members up to 50 mils thick can be carbided and joined. The technique is essentially the same as shown in FIGS. 4 and 5 wherein each rod 18 represents one of the thin members and the overlying portions of the filament 12a represents another of the thin members. Briefly, the members to be joined are supported in the firing container in contacting relationship. The container is then heated to heat the members to be joined substantially uniformly throughout their mass to a temperature from about 1800° C. to about 2500° C., while maintaining the heating temperature at less than that temperature required to melt any surface portion of the members to be joined. The heating atmosphere, as before, consists essentially of vaporized carbon from the container, nitrogen and inert gas wherein the volume ratio of nitrogen to inert gas is from about 10/90 to about 60/40. This heating is continued until the members display the gold color of substantially stoichiometric tantalum carbide, and thereafter the members are cooled in a non-oxidizing atmosphere. In order to effect the carbiding in a relatively rapid fashion the carbiding temperature should be at least about 1800° C., and should not exceed about 2500° C. in order to minimize any tendency to melt or to powder the material being carbided. While tantalum carbide, per se, has an extremely high melting point, apparently the melting point of the ternary tantalum-carbon-nitrogen is relatively low.

The present method can also be used to join relatively massive members which are formed of refractory metal carbides and such a technique is shown in FIG. 7. In accordance with the present invention, the massive members 36 to be joined are previously carbided in accordance with known techniques. Thereafter, they are placed in the graphite firing container 48 and either a sheet of tantalum powder or alloy principally comprising tantalum powder 40 is placed between the members to be joined and in contacting relationship therewith. Thereafter, the container 38 is heated to heat the members 36 to be joined, as well as the tantalum sheet or powder 40 interposed therebetween to a temperature of at least 1800° C., with the heating atmosphere consisting essentially of carbon and nitrogen as the only reactive gases, and any remaining gaseous component being inert gas with the volume ratio of nitrogen to inert gas being at least 10/90. The heating is continued until the tantalum sheet or powder 40 displays the gold color of substantially stoichiometric tantalum carbide, which will indicate that the massive carbided members 36 are joined. Thereafter, the joined carbided members are cooled in a non-oxidizing atmosphere. In joining these members, the main limitation on maximum temperature appears to be that of the firing container since the tantalum metal or powder 40 which is carbided to effect the rapid joining may be melted during the carbiding and joining process. In addition, there does not appear to be any limitation on the percentage of nitrogen which is used and in some tests, carbiding temperatures of 3100° C. with an atmosphere consisting essentially of vaporized carbon and nitrogen as the only gaseous constituents have been used to rapidly join the massive carbided members. Apparently the effect of the nitrogen in this process is to speed up the carbiding process, whatever the carbiding temperature. At lower carbiding temperatures, such as from 1800° C. to 2500° C. it is extremely difficult to effect such a bond without the use of at least 10 volume percent nitrogen in the carbiding atmosphere.

The foregoing technique for joining the massive carbided members can be used for joining any refractory carbide such as tantalum, tungsten, molybdenum or niobium although the technique as applied to joining tantalum carbide members or members which principally comprise tantalum carbide is probably the most useful because of the extremely high melting temperature of tantalum carbide.

It will be recognized that the objects of the invention have been achieved by providing a method for rapidly carbiding a member formed of tantalum or an alloy principally comprising tantalum. This method is particularly adapted for carbiding filamentary members in a rapid fashion at relatively low temperatures, and the resulting filament will contain a small amount of chemically combined nitrogen. The method can also be used to join relatively thin tantalum members while simultaneously carbiding these members, or to join relatively massive previously carbided members.

As an alternative application, the present filament and method also has uses other than with projection lamps, examples being headlamps and searchlights where a high intensity light source is desirable.

While preferred embodiments of the invention have been illustrated and described in detail, it is to be particularly understood that the invention is not limited thereto or thereby.

What is claimed is:

1. The method of rapidly carbiding a member formed of tantalum or an alloy principally comprising tantalum, which method comprises:
    (a) supporting said member in a firing container consisting essentially of carbon as the only container component which will react with tantalum;
    (b) heating said container to heat said member to a temperature of at least about 1800° C., with the heating atmosphere consisting essentially of carbon and nitrogen as the only reactive gasses, and any remaining gaseous component being inert gas with the volume ratio of nitrogen to inert gas being at least about 10/90;
    (c) continuing said heating until said member displays the gold color of substantially stoichiometric tantalum carbide; and
    (d) cooling said carbided member in a non-oxidizing atmosphere.

2. The method of forming a filamentary member which at least principally comprises tantalum carbide, which method comprises:
    (a) supporting in a firing container consisting essentially of carbon as the only container component which will react with tantalum, a filamentary member of tantalum metal or an alloy principally comprising tantalum metal;
    (b) heating said container to heat said filamentary member substantially uniformly throughout its mass to a temperature of from about 1800° C. to about 2500° C. while maintaining the heating temperature at less than that temperature required to melt any surface portion of said filamentary member, with the heating atmosphere consisting essentially of carbon, nitrogen and inert gas wherein the volume ratio of nitrogen to inert gas is from about 10/90 to about 60/40;
    (c) continuing said heating until said filamentary member displays the gold color and weight of substantially stoichiometric tantalum carbide; and
    (d) cooling said filamentary member in a non-oxidizing atmosphere.

3. The method as specified in claim 2, wherein said filamentary member is supported substantially throughout its said length on a graphite support in said firing container.

4. The method as specified in claim 3, wherein prior to heating said container wherein the container atmosphere consists essentially of carbon, nitrogen and inert gas, said container is initially heated to heat said filamentary member to a temperature of from about 1800° C. to about 2100° C. for at least ten minutes, with the container atmosphere during this initial heating consisting essentially of carbon and inert gas.

5. The method as specified in claim 4, wherein said container is initially heated to heat said filamentary member in an atmosphere consisting essentially of carbon and inert gas to a temperature of about 1800° C. for about twenty minutes, and thereafter said container is heated to heat said filamentary member in an atmosphere consisting essentially of carbon, nitrogen and inert gas to a temperature of from about 2100° C. to 2300° C. for about one hour.

6. The method as specified in claim 5, wherein the volume ratio of nitrogen to inert gas is about 30/70.

References Cited

UNITED STATES PATENTS

| | | | |
|---|---|---|---|
| 3,161,473 | 12/1964 | Pultz | 23—308 |
| 3,409,402 | 11/1968 | Addamiano | 23—308 |
| 3,411,959 | 11/1968 | Corth | 148—13.1 |

CHARLES N. LOVELL, Primary Examiner

U.S. Cl. X.R.

23—208; 148—20.3, 32; 252—516; 313—218